United States Patent [19]
Peterson

[11] 3,758,946
[45] Sept. 18, 1973

[54] APPARATUS FOR REMOVING OVERLAPPED SIDING MATERIALS

[76] Inventor: William C. Peterson, 3828 S. Grand, Spokane, Wash. 99203

[22] Filed: Dec. 30, 1971

[21] Appl. No.: 213,955

[52] U.S. Cl................ 30/257, 29/270, 30/260, 30/337
[51] Int. Cl............................................ B26b 13/04
[58] Field of Search................ 30/236, 235, 337, 30/257, 260, 259, 248, 252, 254, 244; 29/270

[56] References Cited
UNITED STATES PATENTS
2,725,629  12/1955  Todhunter........................ 30/337
2,140,288  12/1938  Heumann........................... 30/248

FOREIGN PATENTS OR APPLICATIONS
1,058,772  11/1953  France............................. 30/257

Primary Examiner—Othell M. Simpson
Assistant Examiner—Mark S. Bicks
Attorney—Greek Wells et al.

[57] ABSTRACT

A tool is described having thin, flexible, high-speed tool steel blades that are detachably mounted to a tool head. The blades may be manually manipulated by handle elements to pivot the blades in a shearing motion. The blades are sufficiently flexible to be unable to shear a nail under normal conditions. The tool is used to remove overlapped siding by inserting the thin flexible blades between the siding elements with the siding elements preventing the blades from twisting and maintaining the blades in a shearing plane to sever the nail.

5 Claims, 6 Drawing Figures

PATENTED SEP 18 1973                    3,758,946

APPARATUS FOR REMOVING OVERLAPPED SIDING MATERIALS

BACKGROUND OF THE INVENTION

This invention relates to methods and apparatus for removing siding materials from building structures.

It is often desirable, for a multitude of reasons, to remove layers of siding from an exterior wall of a building structure, particularly a house, without damaging the siding so that it can be reused. The traditional method for removing nailed-on siding materials is with the use of a claw hammer in which the claw is inserted under the head of the nail with the hammer being levered to pry the nail from the siding. This generally results in significant damage or breakage to the siding materials to render them unuseable. This is particularly true for wood and asbestos shakes, which are rather brittle. The wood and asbestos siding shakes generally fracture as the hammer is pivoted to apply a prying force to the nail head.

One of the principal objects of this invention is to provide a method and apparatus for removing overlapped siding materials without breaking or damaging the materials so that they can be subsequently reused.

An additional object of this invention is to provide an efficient process for removing overlapped siding materials in which the securing nail is sheared on the underneath side of the material.

A further object of this invention is to provide an apparatus, particularly a shearing tool that may be inserted between overlapped materials in which the blades are sufficiently thin and flexible so as not to damage or break the building materials.

An additional object of this invention is to provide apparatus having thin flexible blades that are ineffective to shear nails unless the blades are held in a shearing plane to prevent the blades from twisting.

These and other objects and advantages of this invention will become apparent in the reading of the following detailed description of a preferred embodiment.

DETAILED DESCRIPTION OF A PREFERRED EMBODIMENT

Figure 1:
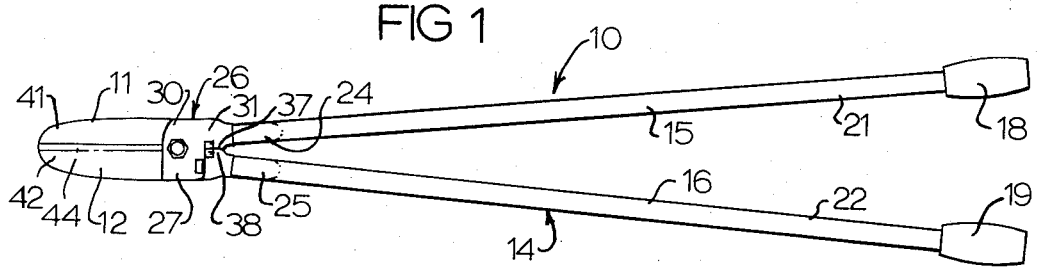
FIG. 1 is a plan view of a tool embodying the principal features of this invention for removing overlapping building materials from the exterior of a building structure.

A tool 10 is illustrated in FIG. 1, having two elongated metal shearing blades 11 and 12 that are interconnected to a handle means 14. The handle means 14 has two handle elements 15 and 16 that are pivotally interconnected for manipulating the blades in a shearing stroke. The handle elements 15 and 16 have gripping ends 18 and 19 that are positioned at the far end of handle shafts 21 and 22 respectively. The handle elements have ends 24 and 25 connected to components of a head 26 of the tool. The head 26 includes pivot plates 27 and 28 that are connected to ends 24 and 25 respectively. The plates 27 and 28 are flat and each have a nose section 30 and a shank section 31. The plates 27 and 28 are pivotally interconnected through a bolt shaft 33. The bolt shaft 33 is affixed to plate 28 and extends outward to project through an aperture 34 formed in plate 28. Offset ear elements 37 and 38 are formed on the shanks 31 to limit the pivotal movement of the handle elements to prevent the gripping ends 18 and 19 from engaging each other and thereby preventing the tool operator from pinching his fingers between the handle elements.

The elongated blades 11 and 12 form components of the head 26 and have tips 41 and 42 respectively. A front edge 44 and a back edge 47 extend from the tip 41 to an enlarged base 50. The front edge 44 forms a shearing edge. The blade 12 likewise has a shearing or front edge 45 and a back edge 48 that extend from the tip 42 to an enlarged base 51.

Figure 2:
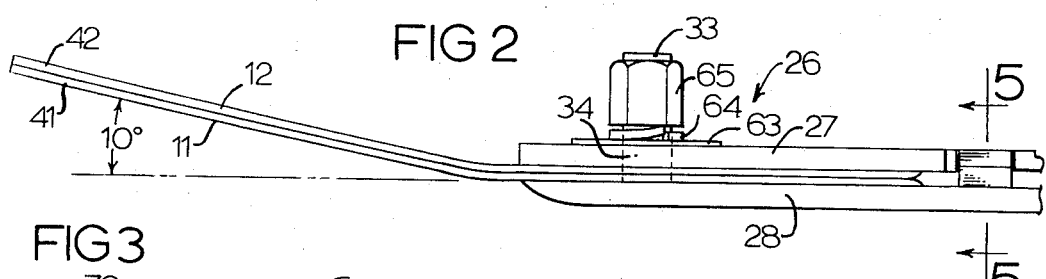
FIG. 2 is a fragmentary side view of the tool illustrated in FIG. 1.

The blades 11 and 12 have a shallow permanent acute angle bend of approximately 10° (FIG. 2) adjacent the enlarged bases 50 and 51 respectively, to enable the extending portion (tips) of the blades to be easily inserted between the siding members. The front edges 44 and 45 are beveled by approximately 15° and are tempered to increase the shearing efficiency and to extend the life of the blades.

The blades 11 and 12 have bolt apertures 53 and 54 formed therein respectively to receive the bolt shaft 33. The tool head 26 has interlocking means 56 for pivotally interlocking the blades 11 and 12 to the pivot plates 27 and 28 respectively to cause the blades to pivot in a scissor action in response to the pivotal movement of the handle elements. Interlocking means includes notches 58 and 59 formed respectively in the plates 27 and 28 along the periphery of the plates spaced from the shaft 33. Complementary bent tab portions 51 and 52 are formed in the base sections of the blades 11 and 12 respectively for lodging in the notches 59 and 58 respectively to cause the blades 11 and 12 to pivot in response to the pivotal movement of the handle elements. A plain washer 63, a lock washer 64 and an aircraft-type lock nut 65 are positioned on the end of the shaft bolt 33 to hold the plates and blades laterally together. The lock washer 64 serves as a high resistant spring to permit the blades 11 and 12 to slide (pivot) relative to each other without bending.

Each of the blades 11 and 12 are constructed on thin guage high-speed tool steel and preferably band saw steel material having a thickness of between 0.025 and 0.060 inches. The blades are sufficiently long so that the bent tips of the blades extend well beyond the nail being sheared. The thin blades are sufficiently flexible that they are unable to shear a nail and would twist or deflect from each other if the blades are not held together in a shearing plane.

Figure 3:
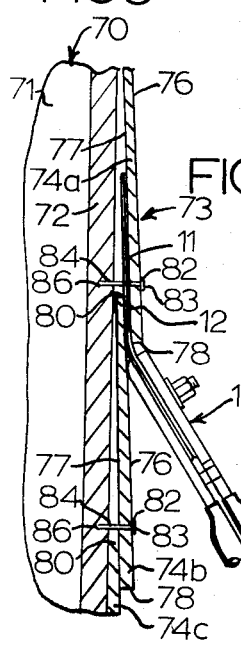
FIG. 3 is a sectional view of the side of a building structure illustrating the use of the tool for shearing securing nails of the overlapping building materials.
Figure 4:
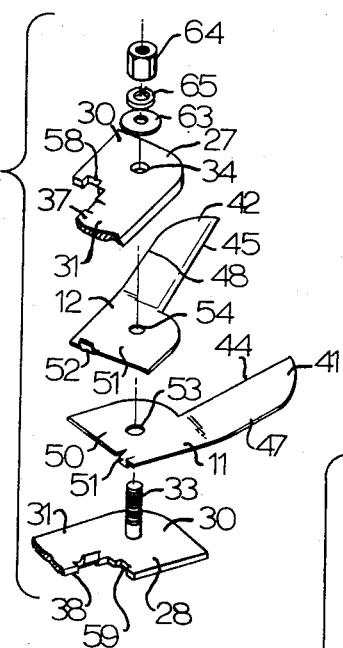
FIG. 4 is an exploded fragmentary view illustrating components of the tool.

The tool is utilized in removing nailed-on overlapping siding materials from a building structure. A representative building structure 70 is illustrated in FIG. 3 having a wall 71 with an outside layer 72. The outside layer has siding 73 mounted thereto which includes a plurality of overlapping siding elements 74. For identification, the siding elements are designated 74a, b, & c.

Figure 5:
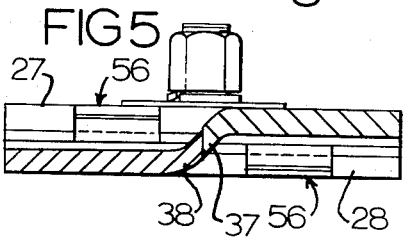
FIG. 5 is a vertical cross-sectional taken along line 5—5 in FIG. 2.
Figure 6:
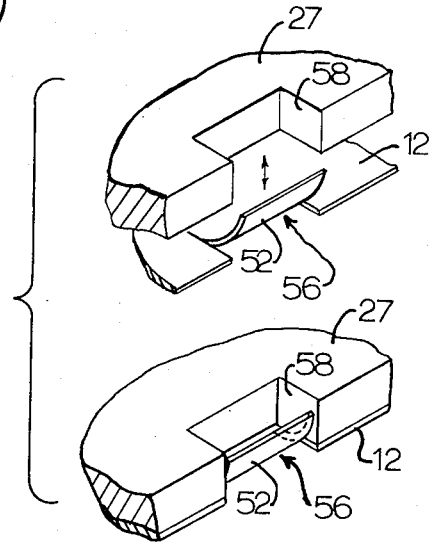
FIG. 6 is a fragmentary perspective view showing sequence means for locking blades to the head of the tool.

Each of the siding elements has an outside surface 76 and an inside surface 77. The inside surface of one element 74 overlaps the outside surface of the lower adjacent element. Each of the siding elements has a lower edge 78 and a top edge 80. Each element 74 is secured to the outside layer 72 of the building structure by nails 82. Each nail 82 has a nail head 83 and a shaft 84 that extends from the head to a tip 86. When the nail is inserted through the siding element, a section of the shaft 84 extends from the inside surface 77 into the wall layer 72 as illustrated in FIG. 5. Most overlapped siding is applied to the wall by starting near the bottom and working upward placing the next layer immediately above the previous layer. Generally, the nail is inserted through a shingle at a location just above the top edge 80 of the previous layer so that the nail does not extend through more than one shingle.

In the performance of the process, the bent thin blades 11 and 12 are inserted between overlapping siding elements as shown in FIG. 3 with the blades straddling a shaft section of the nail securing the outer overlapping siding element. The tips of the blades extend far beyond the straddled nail. The blades are sufficiently thin so that they do not bow or deflect the siding about the nail head. Back pressure is exerted on the blades by the outer surface 76 of the lower siding element 74b and the inner surface 76 of the upper siding element 74a, to hold the blades together in a shearing plane, to prevent the blades from deflecting or twisting relative to each other. The handle elements 15 and 16 are then pivoted toward each other to bring the blades against the nail shaft section to shear the nail on the underside of the siding element. As the blades are pivoted, they are maintained in the shearing plane by the pressure exerted by the siding elements. As previously mentioned, if it were not for the pressure exerted on the blades by the siding itself, the blades would twist and would be unable to shear the nail. The blades are sufficiently thin to be inserted between the siding elements without damaging the siding, with the additional advantage of the siding itself providing sufficient pressure on the blades to maintain the blades in their shearing plane to prevent the blades from twisting or flexing when the shearing edges engage the nail shaft section.

Another significant advantage is that worn blades may be readily detached and replaced by merely removing the nut from the bolt 33 and removing the old blades and inserting new blades between the plates 27 and 28. There is no need to discard the whole tool if only the blades are worn or damaged.

It should be understood that the above described embodiment is simply illustrative of the principles of this invention and that numerous other embodiments may be readily devised by those skilled in the art without deviating therefrom. Therefore, only the following claims are intended to define this invention.

What I claim as my invention and for which I seek protection under the laws of the United States of America, is:

1. A tool adapted for non-destructively removing overlapping siding elements in which each element is secured to a building structure by one or more nails that is placed through the element with a nail shaft section projecting from an inside surface into the building structure to hold the inside surface in overlapping engagement with an outside surface of an adjacent element, comprising:

a pair of elongated operatively interconnected thin flexible metal blades that are sufficiently thin to enable the thin flexible blades to be inserted between the overlapped siding elements and straddle the nail shaft section with the thin flexible blades being held in a shearing plane by the overlapping elements without breaking or damaging the overlapped elements;

handle means operatively secured to the blades for moving the blades together in a shearing motion to sever the nail at the nail section as the blades are maintained in the shearing plane by the siding elements;

said blades being sufficiently flexible to bend with respect to the handle means to adjust to the shearing plane between the siding elements without breaking the siding elements; and said blades being sufficiently flexible to spread apart and be incapable of shearing said nail without the blades being held in the shearing plane by the overlapping siding elements.

2. The tool as defined in claim 1 wherein the blades are detachably connected to the handle means.

3. The tool as defined in claim 1 comprising a tool head that has plates that are pivotally interconnected by a shaft defining a pivot axis and wherein the blades are mounted between the plates with the shaft extending through the blades and further comprising interlocking means operatively and pivotally interconnecting the blades and the plates to pivot the blades about the pivot axis in response to pivotal movement of the plates.

4. The tool as defined in claim 3 wherein the interlocking means includes at least one notch formed in each plate and wherein each blade has at least one corresponding tab projecting into a corresponding notch to operatively and pivotally interlock the blades and the plates.

5. The tool as defined in claim 1 wherein each blade is formed from band saw high-speed tool steel having a thickness between 0.025 and 0.060 inches.

* * * * *